United States Patent

[11] 3,627,701

| [72] | Inventors | Donald M. Coyne<br>Prairie Village;<br>Roger P. Cahoy, Merriam, both of Kans. |
|---|---|---|
| [21] | Appl. No. | 793,210 |
| [22] | Filed | Sept. 16, 1968 |
| [45] | Patented | Dec. 14, 1971 |
| [73] | Assignee | Gulf Oil Corporation<br>Pittsburgh, Pa. |
|  |  | Original application Apr. 12, 1966, Ser. No. 541,955, now Patent No. 3,444,240, dated May 13, 1969, which is a continuation-in-part of application Ser. No. 208,637, July 9, 1962, now abandoned, which is a continuation-in-part of application Ser. No. 247,267, Dec. 26, 1962, now abandoned, which is a continuation-in-part of application Ser. No. 247,268, Dec. 26, 1962, now abandoned, which is a continuation-in-part of application Ser. No. 247,307, Dec. 26, 1962, now abandoned. Divided and this application Sept. 16, 1968, Ser. No. 793,210<br>The portion of the term of the patent subsequent to Oct. 3, 1984, has been disclaimed. |

[54] OXIDATION OF ISOBUTYLENE TO METHACRYLALDEHYDE OVER COMPLEX TUNGSTEN OXIDE CATALYSTS
1 Claim, No Drawings

| [52] | U.S. Cl. | 252/439, 252/437, 260/604 |
|---|---|---|
| [51] | Int. Cl. | B01j 11/74 |
| [50] | Field of Search | 260/604; 252/437, 439, 435 |

[56]  References Cited
UNITED STATES PATENTS

| 2,383,711 | 8/1945 | Clark et al. | 252/439 |
|---|---|---|---|
| 3,009,960 | 11/1961 | Shotts et al. | 252/439 X |
| 3,168,572 | 2/1965 | Voge et al. | 252/467 X |
| 3,192,259 | 6/1965 | Fetterly et al. | 252/437 X |
| 3,446,753 | 5/1969 | Cahoy et al. | 252/439 X |

FOREIGN PATENTS

| 1,001,505 | 8/1965 | Great Britain | 260/604 |
|---|---|---|---|
| 8,805 | 8/1968 | Japan | 252/437 |

*Primary Examiner*—Patrick P. Garvin
*Attorneys*—Richard L. Kelly, Carl A. Cline and Forrest D. Stine ABSTRACT: Isobutylene, either pure or in crude mixtures with other hydrocarbons is oxidized in vapor phase over catalysts containing the mixed oxides of copper, tellurium and tungsten, preferably within a temperature range of about 430 to 480° C., to yield methacrylaldehyde. The catalysts are coated on refractory solids of low surface area.

OXIDATION OF ISOBUTYLENE TO METHACRYLALDEHYDE OVER COMPLEX TUNGSTEN OXIDE CATALYSTS

This application is a division of U.S. Ser. No. 541,955, now U.S. Pat. No. 3,444,240 which is a continuation-in-part of U.S. Pat. applications, Ser. Nos. 208,637, filed July 9, 1962, and Ser. No. 247,267, Ser. No. 247,268 and Ser. No. 247,307 filed Dec. 26, 1962 all now abandoned.

The present invention is directed to the oxidation of 2-methylpropene (isobutylene) to methacrylaldehyde (methacrolein) with maximum selectivity and catalyst life, with minimum expense for catalyst replacement and without the necessity of using purified isobutylene as raw material.

In U.S. Ser. No. 208,637 the applicants disclosed the oxidation of isobutylene by contacting a gaseous feed stream consisting of isobutylene, air and steam with a novel metal oxide catalyst complex, for example, a composition having the empirical formula $Cu_9Te_{0.9}PW_{12}O_{49.3}$ supported on lumps of cemented silicon carbide aggregate. The use of a catalyst composition having the empirical formula $Cu_9Te_{0.9}W_{12}O_{48.8}$ is also specifically exemplified in the application to demonstrate the effectiveness of simple compositions based only on the metal oxides which are essential for production of the catalyst for isobutylene oxidation. In the prior application the conversion of isobutylene at rates of 35 percent or more with a corresponding yield (selectively) of 30 to 50 percent are exemplified, specifically, to illustrate the type of results which are obtained by the disclosed process.

Briefly, our process for converting isobutylene to methacrolein may be described as comprising reacting isobutylene at a temperature within the range of about 350° to 525° C. in the presence of oxygen and a metal oxide composition produced by heating an intimate mixture consisting essentially of oxides of copper, tungsten and tellurium to a temperature at least as high as that employed in converting isobutylene to methacrolein, said oxides being present in a ratio of about 1 to 20 moles of copper oxide and at least 0.01 mole of tellurium oxide per 12 moles of tungsten oxide, said metal oxide composition being on the surface of a refractory solid which is essentially nonreactive with respect to the metal oxide composition and possesses a surface area of less than about 10 square meters per gram.

So that the process may be better understood, there is presented below a detailed discussion with illustrative examples.

A. THE CATALYST

Before operating the process, it is necessary to obtain a quantity of the catalyst, which is of an unusual type, possessing some unique characteristics. The selection of the particular metal oxide composition for the purpose is based on its ability to convert isobutylene to methacrolein with high selectivities, even when high conversion rates are maintained, so as to facilitate continuous operation with minimum production of tars and byproducts. The preferred metal oxide compositions are capable of extraordinarily high yields of methacrolein per pound of active catalyst. Consequently, small differences in the price of the catalyst raw materials have no great economic significance, unless they directly affect the useful life or the overall activity of the catalyst. The selection of raw materials for catalyst manufacture is therefore based mainly on these factors, as well as convenience.

1. Catalyst Carrier or Support

The catalyst support is selected for durability and enhancement of catalyst activity and life. Silicon carbide aggregate consisting of crystals of silicon carbide cemented together to form porous masses has been found to possess the best combination of properties. However, other refractory solids which are nonreactive with respect to the metal oxide composition such as, for example, alumina and zirconium silicate can be employed, providing they have a surface area of less than about 10 square meters per gram and preferably less than 5 square meters per gram. The size and shape of particles of catalyst support are selected so as to minimize packing, clogging and formation of large cavities in the catalyst bed.

2. Catalyst Composition

The catalyst composition which is coated on the support is of the metal oxide type, consisting of a complex system resulting from interaction of oxides of copper, tungsten and tellurium. A suitable composition can be prepared, for example, by forming an intimate mixture of these oxides in the proportions indicated below, followed by interaction at elevated temperature:

| | |
|---|---|
| CuO | 1 to 20 moles |
| TeO₂ | 0.01 to 10 moles |
| WO₃ | 12 moles |

The empirical formula of the catalyst may vary over rather broad limits, as indicated by the above ranges of proportions. Although the composition of the catalytically active sites in such a composition may have a specific empirical formula, this would be difficult to prove. However, the limits of the empirical formula of a preferred catalyst possessing optimum activity and selectivity are as indicated below:

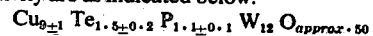
$Cu_{9\pm1}Te_{1.5\pm0.2}P_{1.1\pm0.1}W_{12}O_{approx.50}$

The oxygen content of the composition exhibits some variability and is difficult to determine accurately. Since metal oxides in general are nonstoichiometric compositions, some variability in the oxygen analysis is not unusual. An intimate mixture of metal oxides may conceivably be made by grinding or mulling followed by heating. However, the preferred method of manufacture is to prepare an aqueous solution of water-soluble compounds of copper, tellurium and tungsten, coat the solution on a carrier, evaporate the water and then heat the dried solid material. In the preferred method of catalyst manufacture, differential thermal analysis indicates that at least one reaction occurs at temperatures substantially lower than the temperatures at which the isobutylene oxidation process is customarily operated. For instance, in manufacturing the composition set forth above by empirical formula, the dried coating of soluble salts appears to undergo reactions within the range of about 115° to 175° C. to yield a product of apparently stable composition. For want of a better descriptive term this product is called an intimate mixture of metal oxides. Although the best performing product has a rather definite empirical formula and is obtained by means of a chemical reaction, it is very difficult to characterize. The profuseness of peaks obtained by X-ray diffraction appears to indicate an extremely complex molecular or crystalline structure (a very large number of ordered spatial arrangements of atoms). Occasionally a sample of this intimate mixture of metal oxides gives indication of undergoing another reaction at about 350° C., which is apparently irreversible during the normal useful life of the substance as a catalyst.

For the sake of convenience in producing an adherent coating of uniform composition on the catalyst support, it is preferred to employ water-soluble metal salts in homogeneous solution. Preferably, these are salts such as nitrates, phosphotungstates, silicotungstates, tellurates and ammonia complexes, which decompose very readily to form an intimate mixture of metal oxides. If true homogeneous solutions are not readily obtainable with materials at hand, undissolved components may be incorporated as dispersed or suspended particles with satisfactory results.

Following is a suitable procedure for preparation of the preferred type of catalyst:

Example I

A hot solution of 13 g. of $Cu(NO_3)_2 \cdot 3H_2O$, 1.3 g. of telluric acid and 20.6 g. of phosphotungstic acid in 65 ml. of water is added with stirring to 328 g. of a silicon carbide aggregate having a 4- to 6-mesh size. The addition is carried on in such a manner that the evaporation of the water and nitrogen oxide evolution are very rapid. The resulting dry particles of catalyst are fired in an oven for 2 hours at 1,000° F. The dried catalyst is obtained in a yield of 351 g. The empirical formula of the catalyst is $Cu_9Te_{0.9}PW_{12}O_{40.3}$ (empirical formulas given determined by calculation). The effectiveness of the catalyst composition in carrying out the process is demonstrated as follows:

A portion of the catalyst (200 ml.) is placed into a 400-ml. oxidation reactor. An isobutylene feed stream is employed having the following composition by volume: isobutylene—14.2 percent; air—73.4 percent; and water 12.4 percent. The reaction is conducted at approximately atmospheric pressure employing a temperature of 526° C. The apparent contact time of the gaseous feed with the catalyst bed is an average of 2.2 seconds. The product is recovered in the customary manner employing water scrubbers and is analyzed by the Orsat and GLC methods (as used herein, "GLC" means "gas liquid chromatography"). The conversion of isobutylene is 32 percent and the yield of methacrolein is 56 percent.

Water solubility of reactants was obtained by the use of phosphotungstic acid in the above procedure. However, solubility of reactants may be achieved conveniently by other means as shown in the procedure below.

Example II

A copper-tungsten-tellurium catalyst of this invention is prepared as follows: Tungstic acid (18 g.) is dissolved in 75 ml. of ammonium hydroxide. The solution is added to 225 g. of commercially available aluminum oxide having a low surface area (sold by Carborundum Company under designation "Grade AMC"). The volatiles are evaporated and the particles are coated by stirring. The partially coated carrier is heated at 500° F. for 1 hour. After cooling, the alumina-tungstic acid particles are treated with a solution containing 13 g. of $Cu(NO_3)_2 \cdot 3H_2O$, 1.3 g. of telluric acid and 65 ml. of water. After removing the volatiles under low heat, the catalyst is heat-treated for 2 hours at 1,000° F. The final fired catalyst having 8.0 percent complex is obtained in a yield of 277 g. Empirical formula: $Cu_9Te_{0.9}W_{12}O_{46.8}$.

A 200-ml. portion of the catalyst is charged into the conventional oxidation reactor employed in example I. The heated catalyst bed is contacted with a mixed vapor feed stream having the following composition by volume: isobutylene—9.5 percent, air—39.7 percent, and steam—50.8 percent. The reaction is conducted at approximately atmospheric pressure at an average temperature of 515° C. The average contact time is about 2.5 seconds. The reaction products are analyzed by the Orsat and GLC methods. A 35 percent conversion of the feed isobutylene is obtained with a methacrolein yield of 50 percent.

Water solubility of reactants is also conveniently obtained by use of silicotungstates, as in the example below.

Example III

A copper-tellurium-silicon-tungsten-oxygen catalyst of this invention is prepared by following essentially the catalyst preparation procedure of example I. The following aqueous mixture is employed in the preparation: 20.5 g. of silicotungstic acid, 13 g. of $Cu(NO_3)_2 \cdot 3H_2O$, 1.3 g. of telluric acid and 75 ml. of water. The mixture is added to 328 g. of a 4–6 mesh silicon carbide aggregate. The weight of the final fired catalyst containing 5.8 percent complex is 348 g. Empirical formula: $Cu_9Te_{0.9}SiW_{12}O_{48.8}$.

A 200-ml. portion of the catalyst is charged into the conventional oxidation reactor employed in example I. The heated catalyst bed is contacted with a mixed vapor feed stream having the following composition by volume: isobutylene—9.5 percent, air—40 percent, and steam—50.5 percent. The reaction is conducted at approximately atmospheric pressure at an average temperature of 472° C. The apparent contact time is 2.3 seconds. The reaction products are analyzed by the Orsat and GLC methods. A 34 percent conversion of the fed isobutylene is obtained with a methacrolein yield of 32 percent.

One problem associated with isobutylene oxidation is the formation of tarlike, nonvolatile byproducts which may deposit in the catalyst bed, on the walls of reactors and pipes or appear in the aqueous mixture obtained upon quenching the hot gases as they leave the reactor. Both isobutylene and oxygen are consumed by this side reaction. It has been disclosed in U.S. Ser. No. 247,267, U.S. Ser. No. 247,268 and U.S. Ser. No. 247,307 that up to about 95 percent of the copper in the catalyst may be replaced by chromium, cobalt or nickel to yield catalysts which may be used with substantial reduction of tar formation. These catalysts, being more complex, are somewhat more expensive to manufacture but the extra expense is justified if the cost of isobutylene feed should increase, or if isobutylene should happen to become a scarce commodity. Preferred catalyst compositions are made by reacting the metallic oxides in approximately the following proportions:

$$Cu_6\ Cr_3\ Te\ W_{12}$$
$$Cu_4\ Co_8\ Te\ W_{12}$$
$$Cu_5\ Ni_3\ Te\ W_{12}$$

Following is exemplified the preparation and use of catalysts in which a portion of the copper is replaced by chromium.

Example IV

A. A copper-chromium-tellurium-phosphorus-tungsten-oxygen catalyst complex is prepared using the following aqueous mixture: 17.2 g. of phosphotungstic acid; 7.3 g. of $Cu(NO_3)_2 \cdot 3H_2O$; 1.15 g. of telluric acid; 6.0 g. of $Cr(NO_3)_3 \cdot 9H_2O$; and 65 ml. of water. Empirical formula: $Cu_6Cr_3TePW_{12}O_{51}$.

B. A copper-chromium-tellurium-silicon-tungsten-oxygen catalyst complex is prepared by using the following aqueous mixture: 17.1 g. of silicotungstic acid; 7.3 g. of $Cu(NO_3)_2 \cdot 3H_2O$; 1.15 g. of telluric acid; 6.0 g. of $Cr(NO_3)_3 \cdot 9H_2O$; and 75 ml. of water. Empirical formula: $Cu_6Cr_3TeSiW_{12}O_{50.5}$.

C. A copper-chromium-tellurium-tungsten-oxygen catalyst complex is prepared as follows: Tungstic acid (18 g.) is dissolved in 75 ml. of ammonium hydroxide. The solution is added to 255 g. of commercially available aluminum oxide having a low surface area (sold by Carborundum Company under the designation "Grade AMC"). The volatiles are evaporated and the particles are coated by stirring. The partially coated carrier is heated at 500° F. for 1 hour. After cooling, the alumina-tungstic acid particles are treated with a solution containing 8.7 g. of $Cu(NO_3)_2 \cdot 3H_2O$; 1.38 g. of telluric acid; 7.2 g. of $Cr(NO_3)_3 \cdot 9H_2O$; and 65 ml. of water. After removing the volatiles under low heat, the catalyst is heat treated for 2 hours at 1,000° F. and cooled. Empirical formula: $Cu_6Cr_3TeW_{12}O_{48.5}$.

There is exemplified below the preparation and use of a catalyst in which a portion of the copper is replaced by cobalt.

Example V

A. A cobalt-copper-tellurium-phosphorus-tungsten-oxygen catalyst complex is prepared using the following aqueous mixture: 17.2 g. of phosphotungstic acid; 4.8 g. of $Cu(NO_3)_2 \cdot 3H_2O$; 11.6 g. of $Co(NO_3)_2 \cdot 6H_2O$; 1.15 g. of telluric acid and 65 ml. of water. Empirical formula: $Co_8Cu_4TePW_{12}O_{52.5}$. B. A cobalt-copper-tellurium-silicon-tungsten-oxygen catalyst complex is prepared by using the following aqueous mixture: 17.1 g. of silicotungstic acid; 4.8 g. of $Cu(NO_3)_2 \cdot 3H_2O$; 11.6 g. of $Co(NO_3)_2 \cdot 6H_2O$; 1.16 g. of telluric acid and 75 ml. of water. Empirical formula: $Co_8Cu_4TeSiW_{12}O_{52}$.

C. A cobalt-copper-tellurium-tungsten-oxygen catalyst complex is prepared as follows: tungstic acid (18 g.) is dissolved in 75 ml. of ammonium hydroxide. The solution is added to 255 g. of commercially available aluminum oxide having a low surface area (sold by Carborundum Company under the designation "Grade AMC"). The volatiles are evaporated and the particles are coated by stirring. The partially coated carrier is heated at 500° F. for 1 hour. After cooling, the alumina-tungstic acid particles are treated with a solution containing 5.8 g. of $Cu(NO_3)_2 \cdot 3H_2O$; 14.0 g. of $Co(NO_3)_2 \cdot 6H_2O$; 1.38 g. of telluric acid and 65 ml. of water. After removing the volatiles under low heat, the catalyst is heat treated for 2 hours at 1,000° F. and cooled.

Example VI

The modification of the catalyst by substituting nickel for a part of the copper is illustrated below.

A. A copper-nickel-tellurium-phosphorus-tungsten catalyst complex is prepared employing silicon carbide aggregate support and the following reactants: 7.3 g. of $Cu(NO_3)_2 \cdot 3H_2O$; 17.2 g. of phosphotungstic acid; 1.15 g. of telluric acid; and 3.4 g. of nickel nitrate hexahydrate in 65 ml. of $H_2O$. The reactants, in the form of a hot aqueous solution, are added with stirring to 184 g. of porous silicon carbide aggregate having a 4- to 8-mesh size. The addition is carried on in such a manner that the evaporation of the water of the mixture is very rapid. The resulting dry particles of catalyst are fired in an oven for 2 hours at 1,000° F. The dried supported catalyst has 6.1 percent by weight of the catalyst complex. The empirical formula of the complex: $Cu_9Ni_3TePW_{12}O_{49.5}$.

B. A nickel-copper-tellurium-silicon-tungsten-oxygen catalyst complex is prepared by using the following aqueous mixture: 17.1 g. of silicotungstic acid; 7.3 g. of $Cu(NO_3)_2 \cdot 3H_2O$; 3.4 g. of $Ni(NO_3)_2 \cdot 6H_2O$; 1.15 g. of telluric acid and 75 ml. of water. Empirical formula: $Ni_3Cu_6TeSiW_{12}O_{49}$.

C. A nickel-copper-tellurium-tungsten-oxygen catalyst complex is prepared as follows: tungstic acid (18 g.) is dissolved in 75 ml. of ammonium hydroxide. The solution is added to 255 g. of commercially available aluminum oxide having a low surface area (sold by Corborundum Company under designation "Grade AMC"). The volatiles are coated by stirring. The partially coated carrier is heated at 500° F. for 1 hour. After cooling, the alumina-tungstic acid particles are treated with a solution containing 8.7 g. of $Cu(NO_3)_2 \cdot 3H_2O$; 5.2 g. of $Ni(NO_3)_2 \cdot 6H_2O$; 1.38 g. of telluric acid and 65 ml. of water. After removing the volatiles under low heat, the catalyst is heat treated for 2 hours at 1,000° F. and cooled.

3. Catalyst Regeneration

The procedure for catalyst regeneration is remarkable for its simplicity:

A 175 cc. (158 g.) portion of a catalyst which has been used more than 2,000 hours and which shows low activity and selectivity is screened to remove approximately 10 percent of the active catalyst component present as loose, nonadherent powder. The spent catalyst is then treated with a solution of catalyst reagents in the same manner as fresh uncoated catalyst support and fired. The new coating is equivalent to about 6.0 percent by weight $Cu_9Te_{1.5}PW_{12}O_{50.5}$ on Carborundum CMC. Testing of a 150 cc. charge of the recoated catalyst in a reactor indicates the catalyst to be essentially identical to the original fresh catalyst.

4. Construction of Catalyst Bed

The catalyst bed is preferably stationary and so positioned that reactants flow downward vertically through the bed. Free space in the reactant entry zone is to be avoided, because of the possible occurrence of noncatalytic gas phase oxidation. Voids in the reactor are preferably packed with particles of inert refractory material so as to discourage free space reactions.

B. REACTION CONDITIONS

1. Reactant Ratios

The hydrocarbon feed stream may contain from about 8 percent isobutylene to substantially pure isobutylene in operation of the process.

The complete reactor feed consists preferably of preheated hydrocarbon, inert diluent and air, which are introduced into the reaction with prior mixing. It is recommended that approximately the following molar ratios of reactants be maintained in the feed streams:

1 mole isobutylene/1.5 moles $O_2$/1 to 15 moles $H_2O$ or other inert diluent, preferably about 1.5 moles.

The presence of steam or other inert diluent prevents erratic behavior of the system. The concentrations of both isobutylene and oxygen in the gaseous stream through the reactor diminish as the reaction proceeds, resulting in a decrease in reaction rate. It may be desirable to take steps to compensate for this effect so as to obtain the best possible conversion. Otherwise, unreacted isobutylene may be recovered and recycled.

2. Temperature

Although the operable temperature range is very broad, for economical operation it is recommended that the temperature be kept within the range of about 350° to 525° C. Preferably, the temperature is only permitted to vary between about 430° and 480° C., with the control point set at about 440° C. With adequate provision for heat exchange, continuous cooling will be employed during operation and fluctuation of temperature will be infrequent. Erratic and violent temperature fluctuations are not inherently characteristic of the process and may be taken as an indication of failure to maintain constant feed ratios or perhaps of excessive oxygen concentration in the system.

3. Pressure

Preferred pressure is 1 atmosphere plus sufficient additional pressure to overcome the resistance of the porous catalyst bed to gas flow. The catalyst bed should offer as little resistance to gas flow as is practically feasible, so as to create the minimum pressure differential in the system.

4. Throughput Rate

Throughput rate may vary greatly, 1 volume of feed gas per volume of catalyst bed every 1 to 15 seconds being reasonable. A preferred range is 1 volume of feed gas per volume of catalyst bed every 2.5 to 3 seconds. At high linear velocities of gas flow through the catalyst bed, better rates of production of methacrolein per hour per volume of catalyst bed can be obtained but the contact time is short and control of this condition becomes more critical. Since the obtaining of the higher production rate is accompanied by this need for more accurate control, some may choose to operate at lower throughput rates, where there are fewer control problems.

C. RECOVERY OF PRODUCT

The product may be recovered by conventional means, that is, a water quench of the hot gases, followed by scrubbing, distillation and other steps, including recovery of unreacted isobutylene and other hydrocarbons. Unreacted propylene, if present, should be removed and not recycled, since propylene is oxidized only to a negligible extent in the process and will accumulate in the recycle stream if not eliminated.

The oxidation of isobutylene without substantial effect on propylene, if present, is clear evidence of the specific nature of the combination of catalyst and reaction conditions in the process as disclosed.

What is claimed is:

1. A metal oxide catalyst composition produced by heating an intimate mixture consisting essentially of oxides of copper, tungsten and tellurium to a temperature at least 350° C., said oxides being present in a ratio of about 1 to 20 moles of copper oxides and at least 0.01 mole of tellurium oxide per 12 moles of tungsten oxide, said metal oxide catalyst composition being coated on the surface of a silicon carbide aggregate refractory solid which is essentially nonreactive with respect to the metal oxide composition and possesses a surface area of less than about 10 square meters per gram.

* * * * *